United States Patent Office 3,388,718
Patented June 18, 1968

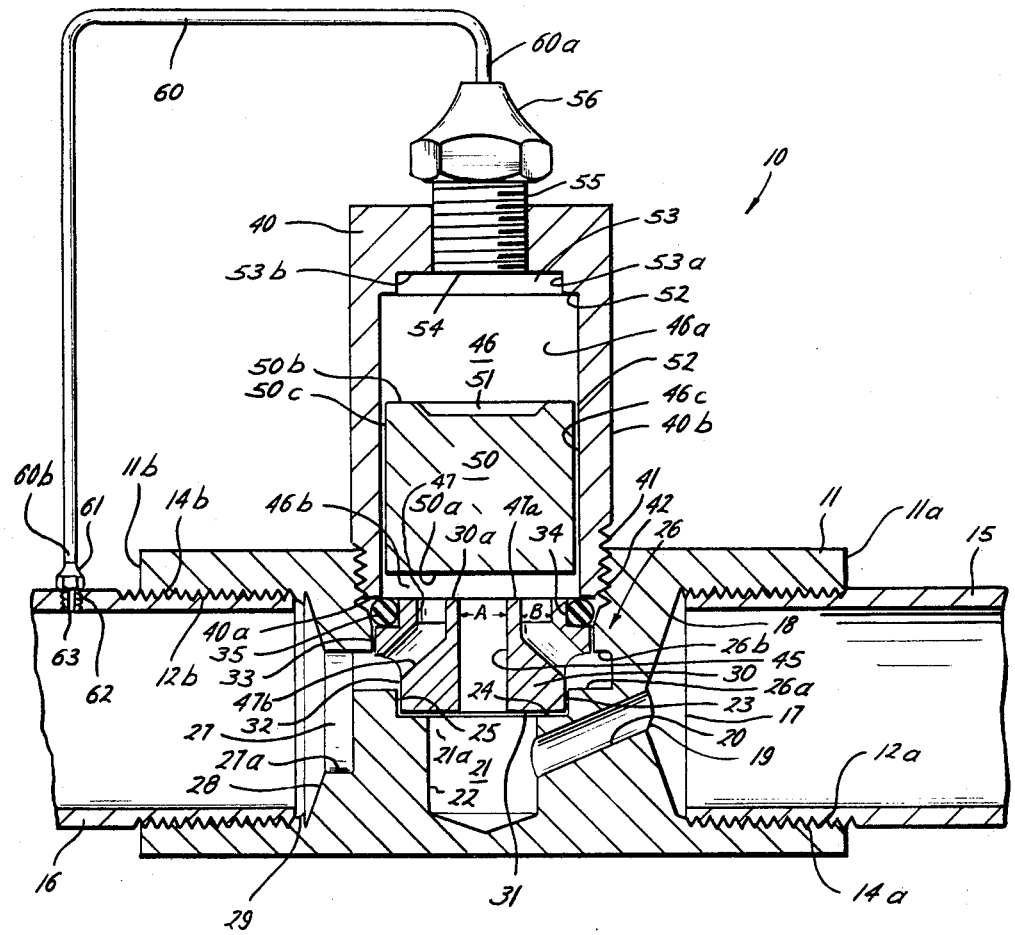
Edward L. Moragne
INVENTOR.
BY Hayden & Pravel
ATTORNEYS

3,388,718
CONTROL VALVE
Edward L. Moragne, 4723 Nenana Drive,
Houston, Tex. 77035
Filed Oct. 10, 1966, Ser. No. 585,566
7 Claims. (Cl. 137—494)

ABSTRACT OF THE DISCLOSURE

A valve positioned between an upstream and downstream tubular member for regulating fluid flow through the tubular members utilizing a valve body with a valve seat member positioned therein having first and second channels communicating with one of each of the upstream and downstream tubular members, respectively. A piston chamber having a piston cylinder positioned in the chamber is adapted to move longitudinally in the chamber in response to fluid pressure and is loose fitting, laterally, in the chamber. A tube line is mounted with the downstream tubular member and communicates with the piston chamber above the piston member such that an increase in downstream pressure causes an increase in pressure in the portion of the piston chamber above the piston cylinder to force the cylinder downwardly to seat on the seat member to prevent communication between the first and second channels in the seat member which thereby prevents fluid communication between the tubular members.

---

This invention relates to a control valve and more particularly to a new and improved control valve for controlling downstream, upstream, or remote pressures in tubular members.

There are many pressure valves operating in the market today. Many such valves utilize diaphragms or bellows operated valve stems or spring loaded variable pressure settings and the like, all of which require many complicated and moving parts for controlling remote pressure in a tubular member.

It is an object of the present invention to provide a new and improved control valve.

Yet another object of the present invention is to provide a new and improved control valve including a valve body, a valve seat member, a piston cylinder, a piston member positioned in said cylinder, and a tube line or control line mounted at one end with a downstream tubular member and at the other end to the piston cylinder shown above the piston member.

The preferred embodiment of this invention will be described hereinafter together with other features thereof, and additional objects will become evident from such description.

The invention will be more readily understood from a reading of the following specification and by reference to the accompanying drawing forming a part thereof, wherein an example of the invention is shown, and wherein the figure is an elevated view, partly in section, of the control valve of the present invention.

Attention is directed to the figure wherein the control valve of the present invention is generally designated by the numeral 10. As illustrated in the figure, a valve body 11 is shown in the embodiment as being generally cylindrical in shape and includes ends 11a and 11b. Each of the ends 11a and 11b is provided with openings, the side walls of which are defined by the internal threads 12a and 12b, respectively, for threaded engagement with the external threads 14a and 14b of an upstream and downstream tubular member 15 and 16, respectively.

It is to be understood that fluids flowing through the valve 10 approaches from the side of the upstream tubular member 15 and is exited through the tubular member 16 as will be brought out hereinafter. It is also to be understood that the tubular members 15 and 16 may be connected to any type of system such as a process system or any other suitable system or device wherein it is desired to regulate or control the operating pressure of the processing system or the pressure within the tubular members 15 and 16.

At the end of the threaded engagement of the tubular member 15 and the valve body 11, such as illustrated at 17, a cone or trough-shaped area designated at 18 is provided with an opening 19 adjacent the nose of the cone which communicates with an upstream channel 20 in the valve body 11.

As illustrated in the figure, the trough or channel 20 communicates at the other end thereof with an upstream chamber 21 formed by the walls 22 in the valve body 11. The upstream chamber 21 communicates adjacent its upper end 21a with a seating chamber 23 which is adapted to receive a valve seat member 30 therein. As illustrated in the figure, the valve seat chamber 23 is provided with a lower annular lip 24 adjacent the upper portion 21a of the upstream chamber 21 and adjacent upstanding side walls 25. Side walls 25 extend upwardly adjacent the annular downstream exit generally designated at 26. The downstream exit 26 includes annular surface 26a and lip 26b as illustrated in the figure, and exit 26 communicates with the tubular member 16 through an annular portion 27 defined by the walls 27a communicating with the downstream exit 26. The annular portion 27 communicates with a trough 28 which is grooved and machined in the valve body 11 immediately adjacent the end 29 of the internal threaded engagement of the tubular member 16 and valve body 11.

As illustrated in the figure, valve seat member 30 includes a lower surface or end 31 which is adapted to rest on the annular surface 24 adjacent the surface 25. An annular arcuate portion 32 extends upwardly and outwardly to the annular lip 33 which is immediately adjacent the downstream exit 26 and is illustrated as being positioned thereabove. Above the lip 33, an annular O-ring seat 34 is provided for receiving the O-ring seal 35 for preventing loss of fluid between the valve seat member 30, valve body 11, and a piston cylinder 40.

The piston cylinder 40 includes a bottom surface 40a which is illustrated as being maintained in sealing engagement with the O-ring seal 34. The piston cylinder 40 is provided with external threads 41 on the outer surface of the cylindrical side walls 40b which are threadedly engaged with the threads 42 in the valve body 11. Thus, it should be apparent that the piston cylinder 40 and valve seat member 30 are positioned between the upstream member 15 and downwstream member 16 as illustrated in the figure.

A first channel or inlet port 45 is illustrated as extending through the valve seat member 30 substantially in the center thereof to enable the upstream chamber 21 to communicate with a chamber 46 in the piston cylinder 40. As illustrated in the figure, the first channel 45 extends from the bottom surface 31 of the valve seat member 30 through said member 30 to the upper surface 30a of such member. A second channel or outlet port 47 is machined or grooved in the valve seat member 30 and is illustrated as enabling the downstream exit 26 to communicate with the piston chamber 46 through a plurality of bores 47b which extend between the exit 26 and the annular groove 47. The second channel means or outlet port 47 is illustrated as being concentrically positioned around the first channel means or inlet port 45, and such channels 46 and 47 are illustrated as being divided by the portion 47a of the valve seat member 30 adjacent the upper surface 30a thereof. It is to be understood that each of the first and second channels 45 and 47 is of a certain sized, predetermined bore such that each is provided with a cross-sectional area as illustrated by the lines A and B adjacent the bottom surface of the piston cylinder 40 and near the lower portion of the chamber 46. Thus, B represents the cross sectional area of the annulus formed by the channel 47 and A represents the cross sectional area of the circle formed by the channel 45. It should also be understood that the valve seat member 30 may be of generally any shape or size. Positioned in the piston chamber 46 is a piston member 50 which is adapted to slide upwardly and downwardly relative to the valve seat member 30 in the chamber 46. As illustrated in the figure, the piston member 50 is shown as being positioned in the chamber 46 with an upper portion 46a and a lower portion 46b of the chamber being positioned above and below, respectively. The piston member 50 is provided with a bottom surface 50a, and an upper surface 50b including the circular depression 51 on the upper surface 50b thereof. It should be noted that the piston member 50 is milled or machined to leave an annular gap 52 between the side walls 50c of the piston member 50 and the internal side walls 46c of the chamber 46.

As illustrated in the drawing, the chamber 46 is defined at its upper end by a lip 52 and a concentric portion 53 which is defined by an annular side wall 53a and the upper surface wall 53b of the chamber 46. The upper surface 53b is provided with an opening 54 therein for receiving a connection member 55 therewith. The threaded connection member 55 is secured at the other end to a sealing nut illustrated at 56 which receives one end 60a of a control line or tube 60. As illustrated in the figure, the control line or tube 60 extends outwardly from the piston cylinder 40 and downwardly to be secured at the other end 60b to the downstream tubular member 16 by the threaded engagement of the sealing nut 61 with the connection member 62 which is illustrated as being threadedly engaged with the tubular member 16 about an opening 63 in such manner. Therefore, it should be apparent that the control line or tube 60 enables the downstream member 16 to communicate with the piston chamber 46 above the piston member 50.

In the course of explanation of the operation of the invention, it should first be explained that the cross-sectional area of the upper surface 50b of piston member 50 is greater than the sum of the cross-sectional area A and B of each of the first and second channels 45 and 47.

In the operation of the invention, fluid flows through the upstream tube 15 and through the channel 20 and to the upstream chamber 21. The fluid then flows up through the first channel 45 and into the chamber 46 in the lower portion 46b thereof. Thereafter, the fluid flows from the lower portion in the chamber 46b out through the second channel means 47 and into the downstream exit 26 and out through the downstream tubular member 16. When the valve is operating smoothly to permit continuous flow therethrough, the total pressure across the cross-sectional area A and B in the channels 45 and 47, respectively, is sufficient to keep the piston member 50 from moving downwardly to close the channels 45 and 47 relative to each other.

However, if the downstream tubular member 16 should become restricted or clogged such that fluid pressure builds up back towards the control valve 10, the pressure across the cross-sectional area B will also build up. Since the feed line 60 communicates the downstream tubular member 16 with the upper portion 46a of the chamber 46, such increase in pressure will also be expected in the upper portion 46a of the chamber. When this occurs, since the cross-sectional area of the upper surface 50b of the piston member 50 is greater than the sum of the cross-sectional areas A and B of the first and second channel means 45 and 47, the total force acting on the upper surface area of the piston member 50 will force said member downwardly to enable the bottom surface 50a of the piston member 50 to seat on the upper surface 30a of the seat member 30, thereby shutting off or closing the first and second channels 45 and 47 from the piston chamber 46 which will also thereby prevent the first and second channels 45 and 47 from communicating with each other through the chamber 46 to close the valve 10. As this restriction occurs, the upstream pressure generally remains constant and when the restriction or clogging and the like have been removed, the downwardly acting pressure on the total upper surface area 50b of the piston member 50 drops, thereby permitting the fluid pressure to force the piston member 50 upwardly once again by the onrushing and exiting fluid from the first and second channels 45 and 47 to suspend the piston member 50 once again in the chamber 46.

As another example, if the upstream pressure should increase, it should be apparent that the ratio of the downstream pressure plus the downwardly acting pressure in the chamber 46 to the upstream pressure would force the piston member 50 downwardly to seat the member 50 on the upper surface 30a of the valve seat member 30 to thereby close the valve 10.

Briefly, the present invention relates to a control valve adapted to control gases and liquids at desired pressures and which includes a valve body for receiving an upstream and downstream tubular member, a valve seat member positioned in said valve body between the upstream and downstream tubular members and having channels therein, one of each of which communicates with the upstream and downstream tubular members, respectively, a piston cylinder having a chamber communicating with said valve seat member, and a control line communicating said chamber with the downstream tubular member above a slidable piston member mounted in said chamber wherein the piston member responds to pressures in the upstream and downstream tubular members to control the flow of fluid or gasses through the control valve.

What is claimed is:
1. A valve positioned between an upstream and downstream tubular member having fluid flow therethrough comprising:
  (a) a valve body having first and second ends and a seating chamber positioned therebetween;
  (b) each of said first and second ends having openings therein for receiving the upstream and downstream tubular member, respectively;
  (c) said valve body having an opening therein positioned between said first and second ends, said opening communicating with said seating chamber in said valve body;
  (d) said valve body having an upstream chamber communicating with said seating chamber and said upstream tubular member;
  (e) a valve seat member positioned in said seating chamber, said valve seat member having a first central channel and a second channel therein;
  (f) said first central channel communicating at one end with said upstream chamber and said second channel communicating at one end with the downstream tubular member;
  (g) a piston cylinder secured with said opening in said valve body between said first and second ends, said piston cylinder having a piston chamber therein communicating with each of the other ends of each of said first and second channels, respectively, in said valve seat member;
  (h) a piston member having an upper and lower surface positioned in said piston chamber, said piston member being loose fitting and movable in said chamber; and
  (i) a tube line mounted at one end with said piston cylinder above said piston member and mounted at the other end to the downstream tubular member wherein said tube line communicating with said piston chamber above said piston member maintains said piston chamber above said piston member directly responsive to changes in the pressure in the downstream tubular member and wherein an increase in pressure in said piston chamber above said piston member forces the piston member downwardly to engage said valve seat member which thereby closes said ends of said first central channel and second channel communicating with said piston chamber below said piston cylinder.

2. The structure as set forth in claim 1 wherein fluid flowing from the upstream tubular member enters said upstream chamber and passes through said first channel in said valve seat member to enter said piston chamber to thereby contact the lower surface of said piston member to raise it continuously upwardly whereby the continuous flowing fluid enters said second channel from said piston chamber to flow out into the downstream tubular member wherein said piston member is suspended in said piston chamber.

3. The structure as set forth in claim 1 wherein fluid entering from said first channel and upstream tubular member enables said piston chamber above said piston member to be directly responsive to the pressure from the incoming fluid due to an annular gap between said piston cylinder and said piston member.

4. The structure as set forth in claim 1 wherein the upper surface area of said piston member exposed to pressure is greater than the sum of the cross-sectional areas of said first and second channels adjacent said piston chamber wherein clogging and restriction of said downstream tubular member increase the pressure in the area of said second channel adjacent said piston chamber and increase the pressure in said piston chamber above said piston member due to the communication of said downstream tubular member with said piston chamber by said tube line whereby the piston member is forced downwardly to seat on said valve seat member thereby preventing said first and second channels from communicating with each other and fluid flow through the valve is thereby prevented until the restriction and clogging is removed.

5. The structure as set forth in claim 1 wherein an undesired increase in pressure in said first channel causes said piston member to move downwardly in said piston chamber to seat on said seat member to thereby prevent communication between said first and second channels in said piston chamber.

6. The structure as set forth in claim 1 wherein said valve seat is interchangeable and the cross-sectional areas of said first and second channels are changed to thereby change the operating conditions of said valve.

7. The structure as set forth in claim 1 wherein said second channel in said valve seat member includes a plurality of openings surrounding said first channel for enabling said piston chamber to communicate with the downstream tubular member.

References Cited

UNITED STATES PATENTS

| | | | |
|---|---|---|---|
| 629,789 | 8/1899 | Honiball | 251—44 X |
| 2,426,900 | 9/1947 | Parker | 251—43 |
| 2,951,496 | 6/1960 | Yarnall et al. | 137—183 |
| 3,162,208 | 12/1964 | Curatola | 137—183 |

M. CARY NELSON, *Primary Examiner.*

R. J. MILLER, *Assistant Examiner.*